United States Patent (10) Patent No.: US 11,559,931 B2
Tabuchi et al. (45) Date of Patent: Jan. 24, 2023

(54) RESIN TANK AND METHOD FOR MANUFACTURING RESIN TANK

(71) Applicants: HONDA MOTOR CO., LTD., Tokyo (JP); TAKAGI SEIKO CORPORATION, Takaoka (JP)

(72) Inventors: Daisuke Tabuchi, Wako (JP); Ko Kurata, Wako (JP); Hikaru Yokomura, Wako (JP); Yuki Mizukura, Wako (JP); Keigo Mine, Wako (JP); Tasuku Yamaguchi, Wako (JP); Tomoyuki Matsumura, Wako (JP); Akira Yoshizawa, Takaoka (JP)

(73) Assignees: HONDA MOTOR CO., LTD., Tokyo (JP); TAKAGI SEIKO CORPORATION, Takaoka (JP)

( * ) Notice: Subject to any disclaimer, the term of this patent is extended or adjusted under 35 U.S.C. 154(b) by 328 days.

(21) Appl. No.: 17/041,541

(22) PCT Filed: Mar. 11, 2019

(86) PCT No.: PCT/JP2019/009757
§ 371 (c)(1),
(2) Date: Sep. 25, 2020

(87) PCT Pub. No.: WO2019/188212
PCT Pub. Date: Oct. 3, 2019

(65) Prior Publication Data
US 2021/0023751 A1    Jan. 28, 2021

(30) Foreign Application Priority Data
Mar. 30, 2018   (JP) ............................ JP2018-069518

(51) Int. Cl.
*B29C 45/14*    (2006.01)
*B62J 35/00*    (2006.01)
(Continued)

(52) U.S. Cl.
CPC ........ *B29C 45/14065* (2013.01); *B29C 45/37* (2013.01); *B29C 45/1671* (2013.01); *B29C 2045/0027* (2013.01)

(58) Field of Classification Search
CPC .... B29C 45/14065; B29C 2045/14213; B29C 2045/1454; B62J 35/00; B60K 15/03
See application file for complete search history.

(56) References Cited

U.S. PATENT DOCUMENTS 6,609,503 B1 * 8/2003 Nakagawa ............... B62J 35/00
                                                     137/565.34
2009/0101642 A1   4/2009 Muto et al.

FOREIGN PATENT DOCUMENTS

FR   2909596 A1 *  6/2008   ....... B29C 45/14065
JP   7-329069       12/1995
(Continued)

OTHER PUBLICATIONS

International Search Report, dated May 14, 2019, 2 pages.
(Continued)

*Primary Examiner* — Robert B Davis
(74) *Attorney, Agent, or Firm* — Rankin, Hill & Clark LLP

(57) ABSTRACT

A resin tank and a method for manufacturing a resin tank in which positional deviation and deformation of an inserted member is prevented. In a resin tank formed through resin injection molding, a gradually changing thickness portion in which a thickness of a resin layer gradually changes from one side to the other side with respect to a surface of an insert plate for attachment of an auxiliary component is formed in the resin layer at a region into which the insert plate is inserted.

11 Claims, 8 Drawing Sheets

(51) Int. Cl.
    *B29C 45/37*    (2006.01)
    *B29C 45/16*    (2006.01)
    *B29C 45/00*    (2006.01)

(56)        References Cited

FOREIGN PATENT DOCUMENTS

| JP | H08-155963 A | 6/1996 |
|----|--------------|--------|
| JP | 2535673      | 2/1997 |
| JP | H09-286367 A | 11/1997 |
| JP | H10-157738   | 6/1998 |
| JP | 2009-236021  | 10/2009 |

OTHER PUBLICATIONS

Written Opinion of the International Searching Authority dated May 14, 2019 filed in PCT/JP2019/009757, 5 pages.
German Office Action with English translation dated Jan. 7, 2022, 15 pages.
International Preliminary Report on Patentability dated Oct. 15, 2020, 10 pages.
Chinese Office Action dated Nov. 8, 2021, Application No. 201980019061 English machine translation included, 21 pages.
Japanese Office Action with English Translation dated Jun. 22, 2021, 7 pages.
Indian Office Action dated Jun. 1, 2021, 5 pages.

* cited by examiner

RESIN TANK AND METHOD FOR MANUFACTURING RESIN TANK

TECHNICAL FIELD

The present invention relates to a resin tank and a method for manufacturing a resin tank.

BACKGROUND ART

In the related art, a resin tank formed by insert-molding an insert plate for attachment of an auxiliary component is known (see Patent Literature 1, for example). Patent Literature 1 describes insert-molding a ring-shaped plate directly inside a resin tank body at the time of blow-molding.

Also, injection-molding using a thermoplastic synthetic resin with a barrier layer inserted into an inner side surface in a case in which a large-scale closed container such as a fuel tank for a vehicle is molded is known (see Patent Literature 2, for example). According to Patent Literature 2, a plurality of split bodies with open shapes are molded through injection molding, and the split bodies are pressurized with circumferential edges of the openings united with each other and are thus integrally bonded to each other, thereby molding a large-scale closed container.

CITATION LIST

Patent Literature

Patent Literature 1: Japanese Utility Model Registration No. 2535673
Patent Literature 2: Japanese Patent Laid-Open No. 10-157738

SUMMARY OF INVENTION

Technical Problem

According to the technology described in Patent Literature 1, thickness deviation may occur in the surroundings of the ring-shaped plate, or an inclination of the inserted ring-shaped plate or a weld bolt is likely to occur, during blow molding, and sufficient molding precision is not obtained. In this regard, the same also applies to injection molding, and in a case in which an insert plate is provided in the vicinity of a resin pouring gate, thickness deviation in the surroundings of the insert plate and an inclination of the plate body or a bolt for attachment of an auxiliary component integrated with the plate body may occur similarly to the blow molding. Thus, securing quality of the inserted part is a problem to be solved.

Also, in a case in which a barrier layer is molded in advance, is inserted into a mold, and is subjected to an injection molding as in Patent Literature 2, disposing a gate portion such that erosion or burr does not occur in the inserted barrier layer due to a flow of a high-temperature high-pressure resin is also a problem to be solved.

The present invention was made in view of the aforementioned circumstances, and an object is to provide a resin tank and a method for manufacturing a resin tank, in which positional deviation and deformation of an inserted member is prevented.

Solution to Problem

The specification includes the entire content of Japanese Patent Application No. 2018-069518 filed on Mar. 30, 2018.

An aspect of the present invention provides a resin tank formed through resin injection molding, including: a gradually changing thickness portion (115) formed in a resin layer at a region into which an insert plate (119) for attachment of an auxiliary component is inserted, a thickness of the resin layer gradually changing from one side to the other side with respect to a surface (119a) of the insert plate (119).

In the aforementioned aspect of the present invention, the gradually changing thickness portion (115) may be provided such that with respect to the surface (119a) of the insert plate (119), a thickness is thick on an upstream side in a resin flowing direction and the thickness is thin on a downstream side in the resin flowing direction, and the surface (119a) of the insert plate (119) may be offset (6) in a direction away from an upstream-side flowing-in portion (115a), of the gradually changing thickness portion (115), located on the upstream side in a direction perpendicular to the surface (119a) of the insert plate (119).

Also, in the aforementioned aspect of the present invention, the resin tank may be adapted such that a resin pouring gate portion (91) is provided at a region surrounded by the insert plate (119), a step portion (113) with an offset (6) with respect to the upstream-side flowing-in portion (115a) is formed, the step portion (113) is caused to serve as a sealing member bonding portion (113) having a horizontal wall (113a) and a vertical wall (113b) extending in a direction perpendicular to the horizontal wall (113a), and an opening shape is formed as an auxiliary component insertion opening (44) with the sealing member bonding portion (113) left.

Also, in the aforementioned aspect of the present invention, the resin tank may be further formed in which a barrier sheet (36b) is inserted and injected, and have an annular projecting portion (114) which accommodates an end portion (112) of an opening portion (110) of the barrier sheet (36b) in a bent state, on an upstream side of the gradually changing thickness portion (115) in a resin flowing direction.

Also, the aforementioned aspect of the present invention may further include: a removed portion (116) from which a resin of the resin pouring gate portion (91) has been removed, wherein the gradually changing thickness portion (115) may be provided such that a thickness is thick on a side close to the removed portion (116) and the thickness is thin on a side away from the removed portion (116) along the flat surface (119a) of the insert plate (119), and a side surface (119c) of the insert plate (119) may be disposed along a wall surface (113b) provided along a direction perpendicular to the flat surface (119a) of the insert plate (119).

Also, in the aforementioned aspect of the present invention, the removed portion (116) may be formed into an opening shape, the insert plate (119) may be disposed in a periphery of the removed portion (116), a horizontal wall (113a) extending in a direction perpendicular to the wall surface (113b) may be formed, and the removed portion (116) may be disposed in the horizontal wall (113a).

An aspect of the present invention provides a method for manufacturing for a resin tank formed through resin injection molding including: positioning and holding an insert plate (119) for attachment of an auxiliary component in a cavity mold (90), and disposing, in a core mold (100), a gradually changing mold surface portion (102) for molding a resin layer (115) such that a thickness of the resin layer gradually changes from one side to the other side with respect to a surface (119a) of the insert plate (119).

Also, in the aforementioned aspect of the present invention, the gradually changing mold surface portion (102) in the core mold (100) may be provided such that with respect to the surface (119a) of the insert plate, the thickness of the resin layer is thick on an upstream side in a resin flowing direction and the thickness of the resin layer is thin on a downstream side in the resin flowing direction, and the insert plate (119) may be held in the cavity mold (90) with an offset (6) in a direction away from a mold surface (92) on the upstream side of the insert plate (119) in a direction perpendicular to the surface (119a) of the insert plate (119).

Also, in the aforementioned aspect of the present invention, a resin pouring gate portion (91) may be provided at a region surrounded by the insert plate (119), a resin from the resin pouring gate portion (91) may be caused to flow with the offset (6) with respect to the mold surface (92) on the upstream side, a sealing member bonding portion (113) with a step difference shape having a horizontal wall (113a) and a vertical wall (113b) extending in a direction perpendicular to the horizontal wall (113a) may be molded, and the resin layer in a periphery of the resin pouring gate portion (91) may be cut with the sealing member bonding portion (113) left to form an auxiliary component insertion opening (44).

Also, in the aforementioned aspect of the present invention, a barrier sheet (36b) including an opening portion (110) may be disposed in the core mold (100) including an annular depressed portion (103) on an upstream side of the gradually changing mold surface portion (102) in a resin flowing direction, with an end portion (112) of the opening portion (110) being accommodated in a bent state in the annular depressed portion (103), and a resin may be caused to flow from upstream beyond the annular depressed portion (103).

Advantageous Effects of Invention

According to the resin tank formed through resin injection molding of the aspect of the present invention, the gradually changing thickness portion in which the thickness of the resin layer gradually changes from one side to the other side with respect to the surface of the insert plate for attachment of an auxiliary component is formed in the resin layer at the region into which the insert plate is inserted. With this configuration, it is possible to deflect an orientation of a flow of a resin applied to the insert plate to a flow in a direction of the surface of the insert plate using the gradually changing thickness portion with respect to flowing of the resin from the resin pouring gate portion for injection molding and thereby to prevent positional deviation and deformation of the insert plate.

In the aforementioned aspect of the present invention, the gradually changing thickness portion may be provided such that with respect to the surface of the insert plate, the thickness is thick on the upstream side in the resin flowing direction and the thickness is thin on the downstream side in the resin flowing direction, and the surface of the insert plate may be offset in a direction away from the upstream-side flowing-in portion, of the gradually changing thickness portion, located on the upstream side in the direction perpendicular to the surface of the insert plate. With this configuration, it is possible to generate a pressure difference due to a difference in flow rate between surfaces of the insert plate by the amount of the offset and thereby to further prevent deviation and deformation of the insert plate.

Also, in the aforementioned aspect of the present invention, the resin tank may be adapted such that the resin pouring gate portion is provided at the region surrounded by the insert plate, the step portion with the offset with respect to the upstream-side flowing-in portion is formed, the step portion is caused to serve as a sealing member bonding portion having the horizontal wall and the vertical wall extending in the direction perpendicular to the horizontal wall, and the opening shape is formed as an auxiliary component insertion opening with the sealing member bonding portion left. With this configuration, positioning precision between the sealing member and the insert plate portion is also improved. In addition, since the resin pouring gate portion is also removed at the same time with the cutting of the auxiliary component insertion opening, this enables working to be simplified.

Also, in the aforementioned aspect of the present invention, the resin tank may be further formed in which the barrier sheet is inserted and injected and have the annular projecting portion which accommodates the end portion of the opening portion of the barrier sheet in a bent state, on the upstream side of the gradually changing thickness portion in the resin flowing direction. With this configuration, since the barrier sheet is accommodated in the annular projecting portion provided on the upstream side of the gradually changing thickness portion in the resin flowing direction in the state in which the end portion of the opening portion of the barrier sheet is bent, burr of the barrier sheet is prevented, a flow of the resin to the insert plate portion is not inhibited, even if the injection molding is performed with the barrier sheet and the insert plate attached to the resin tank, and it is thus possible to further improve quality.

Also, in the aforementioned aspect of the present invention, the resin tank may further include the removed portion from which the resin of the resin pouring gate portion has been removed, the gradually changing thickness portion may be provided such that the thickness is thick on the side close to the removed portion and the thickness is thin on the side away from the removed portion along the flat surface of the insert plate, and the side surface of the insert plate may be disposed along the wall surface provided along the direction perpendicular to the flat surface of the insert plate. With this configuration, a pressure difference due to a difference in flow rate between surfaces of the insert plate is generated, and it is possible to further prevent positional deviation and deformation of the insert plate.

Also, in the aforementioned aspect of the present invention, the remove portion may be formed into an opening shape, the insert plate may be disposed in the periphery of the removed portion, the horizontal wall extending in the direction perpendicular to the wall surface may be formed, and the removed portion may be disposed in the horizontal wall. With this configuration, it is possible to dispose the removed portion in the horizontal wall, to remove the resin pouring gate portion as well at the same time with the cutting of the opening, and thereby to simplify working.

In the method for manufacturing a resin tank through resin injection molding according to the aspect of the present invention, the insert plate for attachment of an auxiliary component is positioned and held in the cavity mold, and the gradually changing mold surface portion for molding the resin layer such that the thickness of the resin layer gradually changes from one side to the other side with respect to the surface of the insert plate is disposed in the core mold. With this configuration, it is possible to deflect an orientation of a flow of the resin applied to the insert plate to a flow in the direction of the surface of the insert plate using the gradually changing mold surface portion with respect to the flowing of the resin from the resin pouring gate portion for injection molding, and thereby to prevent positional deviation and deformation of the insert plate.

Also, in the aforementioned aspect of the present invention, the gradually changing mold surface portion in the core mold may be provided such that with respect to the surface of the insert plate, the thickness of the resin layer is thick on the upstream side in the resin flowing direction and the thickness of the resin layer is thin on the downstream side in the resin flowing direction, and the insert plate may be held in the cavity mold with the offset in the direction away from the mold surface on the upstream side of the insert plate in the direction perpendicular to the surface of the insert plate. With this configuration, since the surface of the insert plate is offset (separated) in the direction away from the mold surface on the upstream side located on the upstream side in the perpendicularly intersecting direction, it is possible to generate a pressure difference due to a difference in flow rate between the surfaces of the insert plate by the amount of the offset and thereby to further prevent positional deviation and the deformation of the insert plate.

Also, in the aforementioned aspect of the present invention, the resin pouring gate portion may be provided at the region surrounded by the insert plate, the resin from the resin pouring gate portion may be caused to flow with an offset with respect to the mold surface on the upstream side, the sealing member bonding portion with a step difference shape having the horizontal wall and the vertical wall extending in the direction perpendicular to the horizontal wall may be molded, and the resin layer in the periphery of the resin pouring gate portion may be cut with the sealing member bonding portion left to form the auxiliary component insertion opening. With this configuration, since the portion with the step difference shape having the horizontal wall and the vertical wall extending in the direction perpendicular to the horizontal wall is caused to serve as the sealing member bonding portion, positioning precision between the sealing member and the insert plate is also improved. In addition, since the resin pouring gate portion is also removed at the same time with the cutting of the auxiliary component insertion opening, this enables working to be simplified.

Also, in the aforementioned aspect of the present invention, the barrier sheet including the opening portion may be disposed in the core mold including the annular depressed portion on the upstream side of the gradually changing mold surface portion in the resin flowing direction with the end portion of the opening portion accommodated in the annular depressed portion in a bent state, and the resin may be caused to flow from upstream beyond the annular depressed portion. With this configuration, since the end portion of the opening portion of the barrier sheet is accommodated in the annular depressed portion provided on the upstream side of the gradually changing mold surface portion in the resin flowing direction in a bent state, burr of the barrier sheet is prevented, a flow of the resin to the insert plate portion is not inhibited, even if injection molding is performed with the barrier sheet and the insert plate attached to the resin tank, and it is thus possible to further improve quality.

DESCRIPTION OF EMBODIMENT

Hereinafter, an embodiment of the present invention will be described with reference to drawings. Note that indications of directions such as front, rear, left, right, up, and down in the description are assumed to be the same as directions with respect to a vehicle body unless particularly indicated otherwise. Also, the reference sign FR indicated in each drawing represents the front side of the vehicle body, the reference sign UP represents the upper side of the vehicle body, and the reference sign LH represents the left side of the vehicle body.

Figure 1:
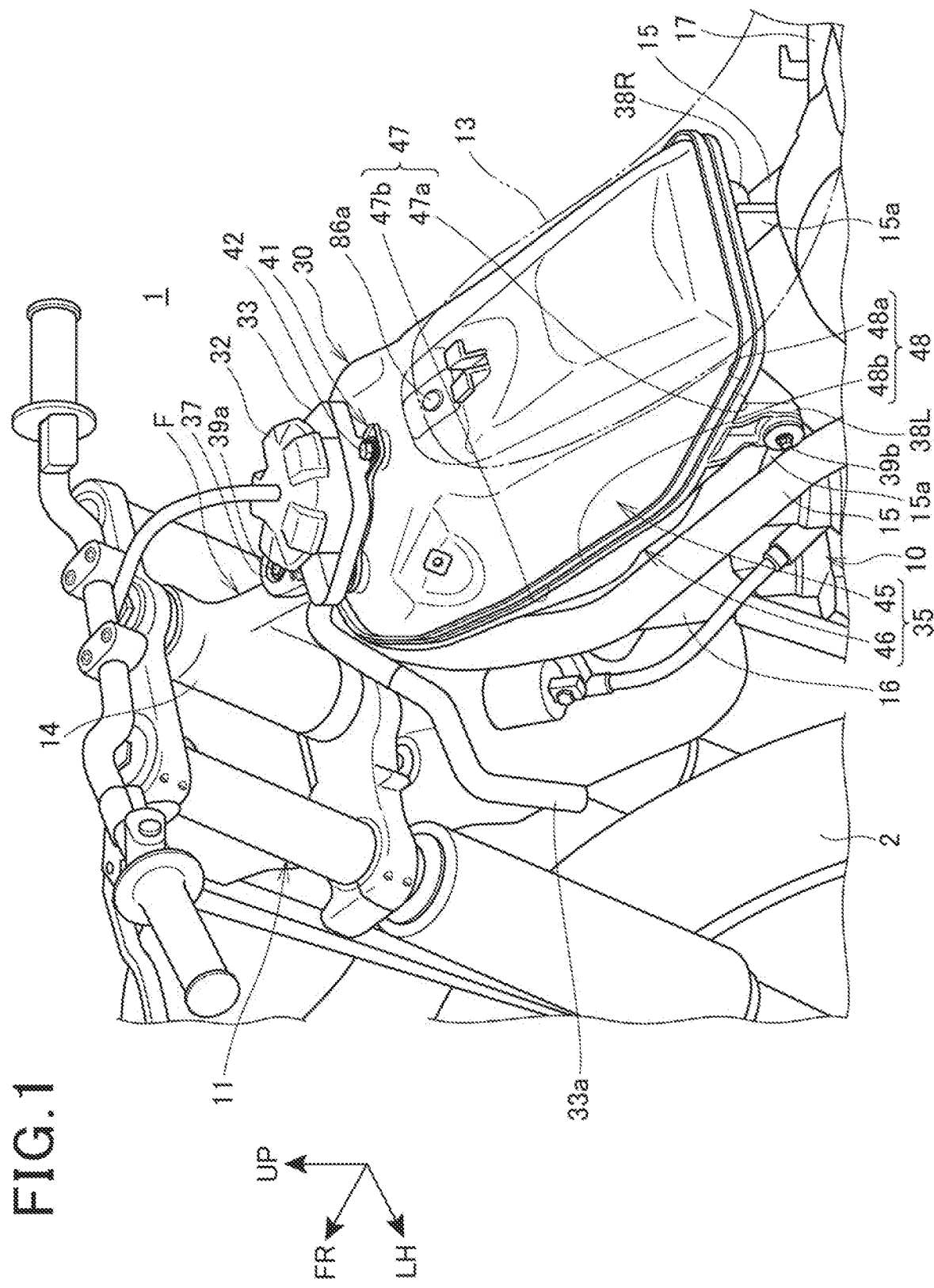
FIG. 1 is a perspective view of a front portion of a motorcycle seen from a left rear side, according to an embodiment of the present invention.

FIG. 1 is a perspective view of a front portion of a motorcycle seen from the left rear side according to the embodiment of the present invention.

A motorcycle 1 is a vehicle in which an engine 10 as a power unit is supported by a vehicle body frame F, a steering system 11 that supports a front wheel 2 in a steerable manner is supported at a front end of the vehicle body frame F in a steerable manner, and a swing arm (not illustrated) that supports a rear wheel (not illustrated) is provided on the side of a rear portion of the vehicle body frame F. The motorcycle 1 is a saddled-type vehicle in which a seat 13 adapted such that a driver is seated therein in a straddling manner is provided above the rear portion of the vehicle body frame F.

The vehicle body frame F includes a head pipe portion 14 that turnably supports the steering system 11, a pair of left and right main frames 15 and 15, a down frame 16, a pair of left and right pivoting frames (not illustrated) extending downward from rear end portions of the main frames 15 and 15 and connected to a rear end of the down frame 16, a pair of left and right seat frames 17 and 17 (the seat frame on the left side is not illustrated) extending rearward from the rear end portions of the main frames 15 and 15, and a pair of left and right sub-frames (not illustrated) extending rear-upward from the pivoting frames and connected to rear portions of the seat frames 17 and 17.

The engine 10 is located below the main frames 15 and 15, and in the vehicle front-rear direction, the engine 10 is disposed between the down frame 16 and the aforementioned pivoting frames (not illustrated).

The seat 13 is disposed above the seat frames 17 and 17 and is supported by the seat frames 17 and 17.

A fuel tank (resin tank) 30 is disposed above the main frames 15 and 15 so as to follow the main frames 15 and 15 and is supported by the main frames 15 and 15. The fuel tank 30 is disposed between the head pipe portion 14 and the seat 13 in the vehicle front-rear direction. A front end portion of the seat 13 covers, from the upper side, an upper surface of a rear portion of the fuel tank 30.

A fuel filler port 31 (see FIG. 2) is provided in an upper surface of a front portion of the fuel tank 30. A tank cap 32 is attached to the fuel filler port 31, and the fuel filler port 31 is closed with the tank cap 32.

A tray 33 surrounding the fuel filler port 31 from its periphery is attached to the fuel tank 30. The tray 33 is disposed between a lower end of the tank cap 32 and the upper surface of the fuel tank 30.

The tray 33 is provided with a drainpipe 33a extending downward. A fuel spilled at the time of filling the fuel is received by the tray 33 and is discharged downward from the drainpipe 33a.

A front portion attachment stay (attachment stay) 37 projecting forward is provided at an upper portion of the front portion of the fuel tank body 35.

The front portion of the fuel tank body 35 is secured to an upper surface of a rear portion of the head pipe portion 14 with a tank securing tool 39a inserted from the upper side into the front portion attachment stay 37.

A pair of left and right rear portion attachment stays (attachment stays) 38L and 38R projecting downward are provided at a lower portion of the rear portion of the fuel tank body 35. The rear portion attachment stays 38L and 38R are secured to tank stays 15a and 15a of the main frames 15 and 15 with each of tank securing tools 39b and 39b inserted from the outside in the vehicle width direction.

Figure 2:
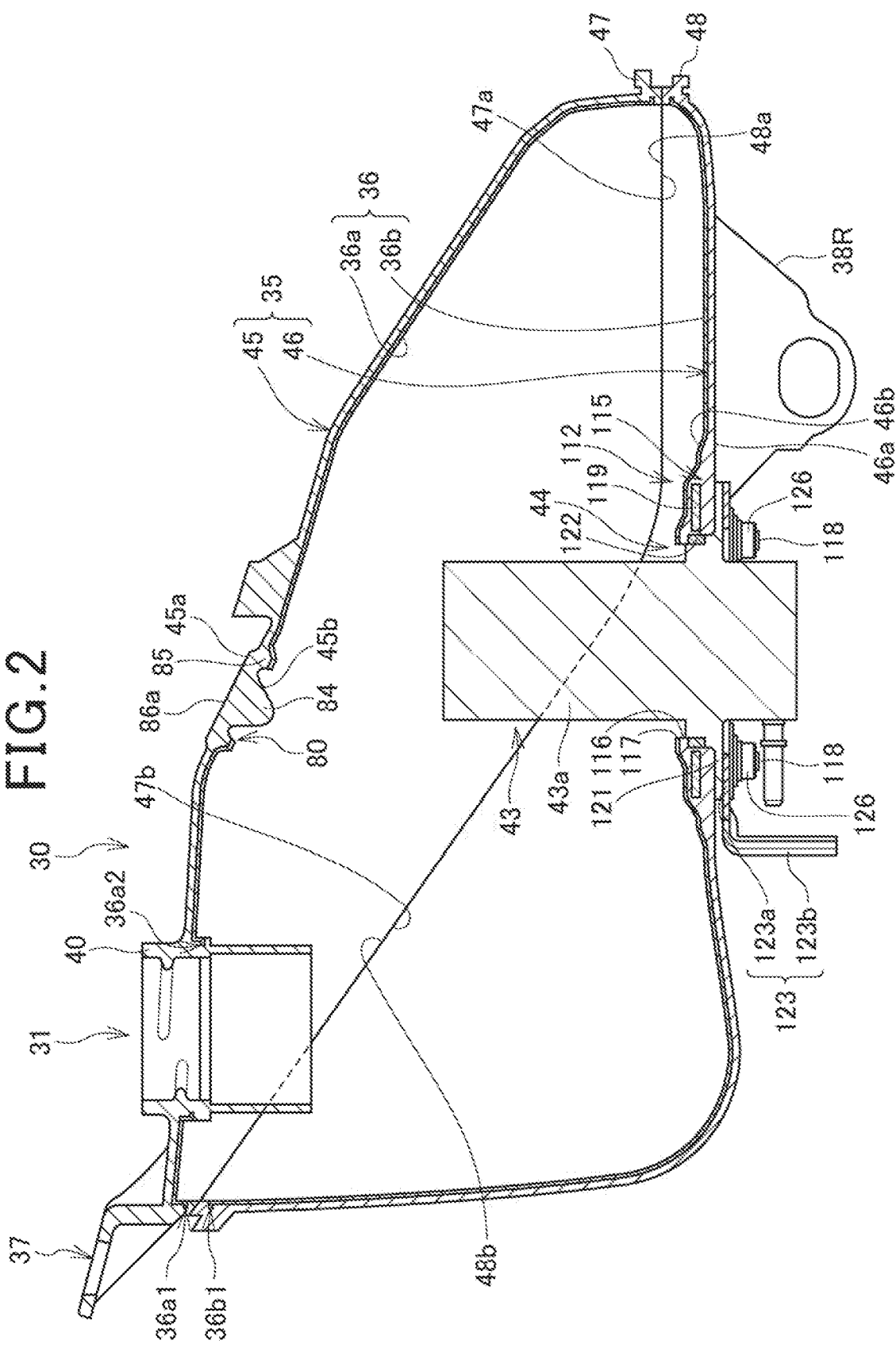
FIG. 2 is a sectional view of a fuel tank cut at a center of a vehicle width.

FIG. 2 is a sectional view of the fuel tank 30 cut at the center of the vehicle width.

The fuel tank 30 includes a fuel tank body (tank body) 35 made of resin and a barrier sheet layer (barrier layer, barrier sheet) 36 provided over substantially the entire inner surface of the fuel tank body 35.

The barrier sheet layer 36 is configured of a material with less fuel transmittance than a material configuring the fuel tank body 35. The barrier sheet layer 36 curbs a fuel such as gasoline stored in the fuel tank 30 transmitted through the fuel tank 30 and leaking to the outside.

The fuel tank body 35 includes a tubular pouring portion 40 for pouring a fuel (for pouring liquid) at the upper portion of the front portion. The tubular pouring portion 40 is a cylinder extending in the up-down direction, and an upper end portion of the tubular pouring portion 40 forms the fuel filler port 31.

The tubular pouring portion 40 is configured of the same resin material as a resin material configuring the fuel tank body 35 and is formed integrally with the fuel tank body 35.

A mouth ring 41 made of metal is attached to the tubular pouring portion 40 as illustrated in FIG. 1. The mouth ring 41 is secured to the upper surface of the fuel tank body 35 with a plurality of mouth ring securing tools (securing tools) 42 inserted from the upper side.

Also, the fuel tank body 35 includes, in a lower surface, a pump attachment port (auxiliary component insertion opening, an opening for attachment of a related part) 44 to which a fuel pump (auxiliary component, related part) 43 is attached.

The fuel tank body 35 is divided into an upper half body 45 (thermoplastic resin layer, one split body) configuring an upper portion of the fuel tank body 35 and a lower half body 46 (thermoplastic resin layer, the other split body) configuring a lower portion of the fuel tank body 35. The fuel tank body 35 is formed into a tank shape by the upper half body 45 and the lower half body 46 being bonded to each other.

The upper half body 45 is formed into a case shape with a lower surface opened downward. A peripheral edge portion of the opening of the lower surface of the upper half body 45 is an upper bonding portion (flange portion) 47 to be bonded to the lower half body 46. As illustrated in FIG. 1, the upper bonding portion 47 includes a planar portion 47a substantially horizontally extending at the rear portion and a slope portion 47b inclined with respect to the planar portion 47a and extending forward toward a front upper side.

As illustrated in FIG. 2, the lower half body 46 is formed into a case shape with an upper surface opened upward. A peripheral edge portion of the opening of the upper surface of the lower half body 46 is a lower bonding portion (flange portion) 48 to be bonded to the upper half body 45. As illustrated in FIG. 1, the lower bonding portion 48 includes a planar portion 48a that is parallel to the planar portion 47a and a slope portion 48b that is parallel to the slope portion 47b. The planar portion 47a is bonded to the planar portion 48a while the slope portion 47b is bonded to the slope portion 48b.

As illustrated in FIG. 2, the barrier sheet layer 36 includes an upper barrier sheet layer 36a (one barrier sheet layer) to be coupled to the inner surface of the upper half body 45 and a lower barrier sheet layer 36b (the other barrier sheet layer) to be coupled to the inner surface of the lower half body 46.

Figure 3:
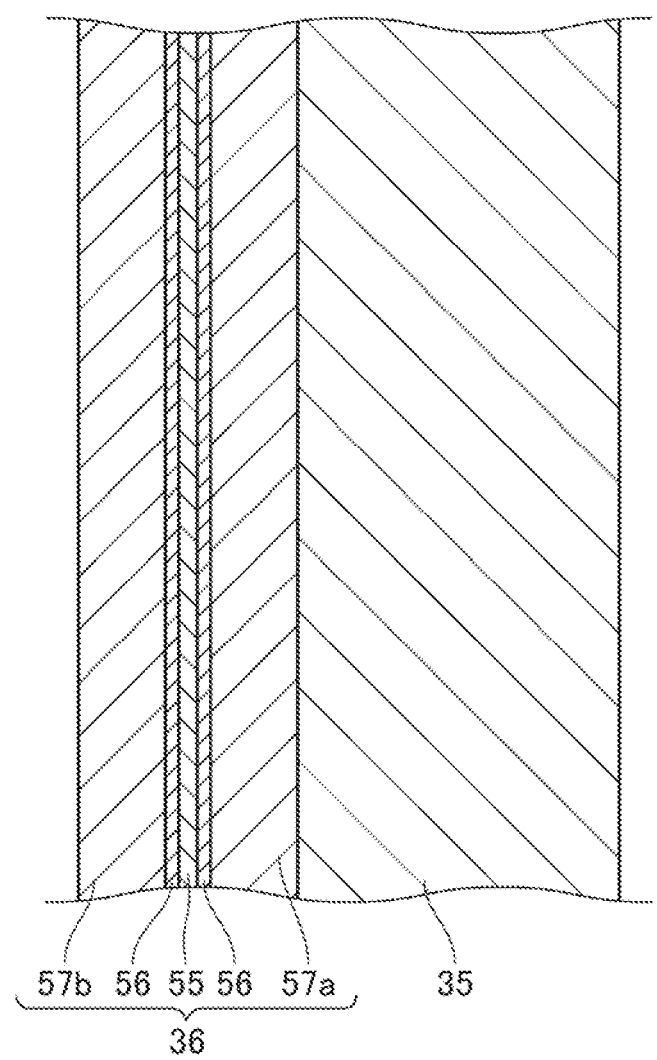
FIG. 3 is a sectional view illustrating a configuration of the fuel tank in a plate thickness direction.

FIG. 3 is a sectional view illustrating a configuration of the fuel tank 30 in the plate thickness direction.

The fuel tank 30 is configured of six layers, namely the fuel tank body 35 that is one resin layer and the barrier sheet layers 36 configured of five layers.

The barrier sheet layer 36 includes a barrier body layer 55, adhesive layers 56 and 56 provided on both surfaces of the barrier body layer 55, and outer layers 57a and 57b caused to adhere to both sides of the barrier body layer 55 via the adhesive layers 56 and 56.

A material of the fuel tank body 35 is high-density polyethylene (HDPE) in one example.

The barrier body layer 55 is configured of a material through which a fuel is more unlikely to be transmitted as compared with high-density polyethylene. The barrier body layer 55 is configured of an ethylene vinyl alcohol copolymer (EVOH) in one example.

The outer layers 57a and 57b are configured of the same material as the material of the fuel tank body 35 and are configured of high-density polyethylene in one example.

The barrier sheet layer 36 is coupled to the inner surface of the fuel tank body 35 via the outer layer 57a on the side of the fuel tank body 35. Since the barrier sheet layer 36 is coupled to the inner surface of the fuel tank body 35 via the outer layer 57a made of the same material as the material of the fuel tank body 35, high adhesiveness to the fuel tank body 35 is achieved, and the barrier sheet layer 36 is fixedly coupled to the fuel tank body 35.

In the barrier sheet layer 36, the outer layer 57b is exposed to the inside of the fuel tank body 35 and is brought into contact with the fuel. It is thus possible to prevent the fuel from being brought into direct contact with the barrier body layer 55.

Figure 4:
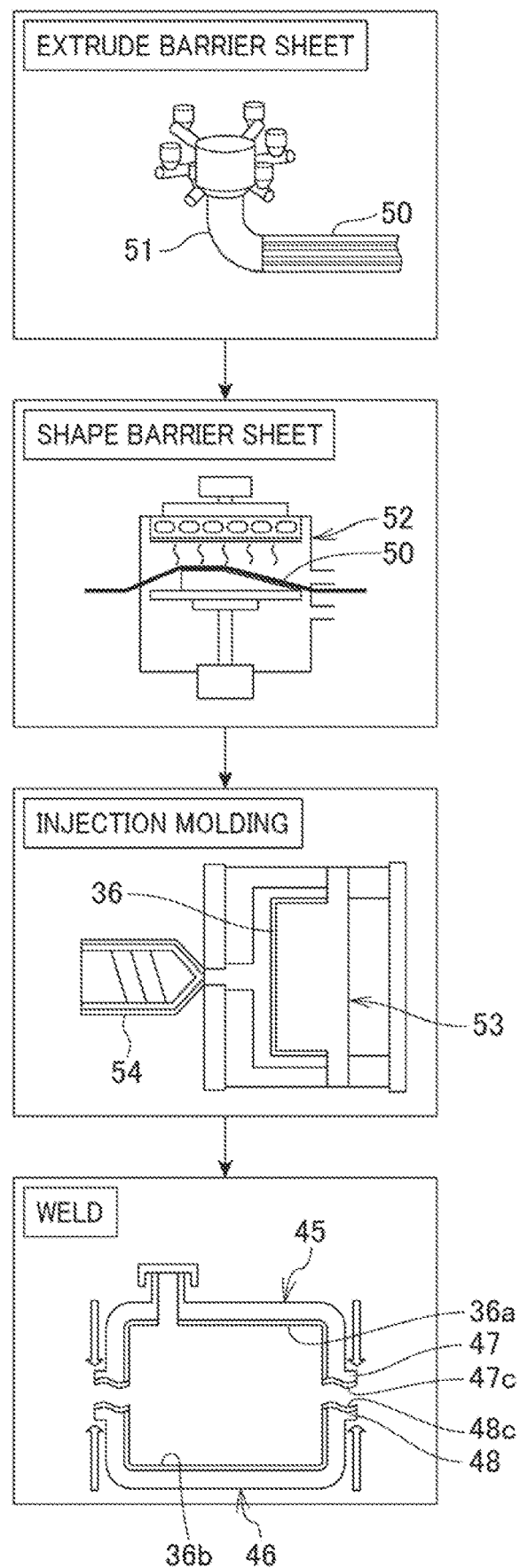
FIG. 4 is a schematic view illustrating a manufacturing process of a fuel tank body.

FIG. 4 is a schematic view illustrating a manufacturing process of the fuel tank body 35.

Referring to FIG. 4, a plurality of materials configuring the barrier sheet layer 36 are supplied to a die 51 for extrusion molding, and a molded article 50 with a sheet shape is extruded from the die 51.

The molded article 50 is shaped to follow the inner surface of the fuel tank body 35 using a vacuum molding machine 52. A peripheral edge portion of the shaped barrier sheet layer 36 is trimmed by a mold for trimming (not illustrated).

The barrier sheet layer 36 after the trimming is set in a mold 53 for injection molding for molding the fuel tank body 35 and is then integrated with the fuel tank body 35 at the time of the injection molding of the fuel tank body 35. In other words, the barrier sheet layer 36 is coupled to the inner surface of the fuel tank body 35 through the insert molding.

Here, the upper barrier sheet layer 36a and the lower barrier sheet layer 36b are individually molded.

The upper barrier sheet layer 36a is coupled to the upper half body 45 at the time of injection molding of the upper half body 45, and the lower barrier sheet layer 36b is coupled to the lower half body 46 at the time of injection molding of the lower half body 46.

Thereafter, an upper bonding surface 47c of the upper bonding portion 47 and a lower bonding surface 48c of the lower bonding portion 48 are melted through heating, and the upper bonding surface 47c and the lower bonding surface 48c are pressure-bonded to each other, thereby integrating the upper half body 45 and the lower half body 46.

Figure 5:
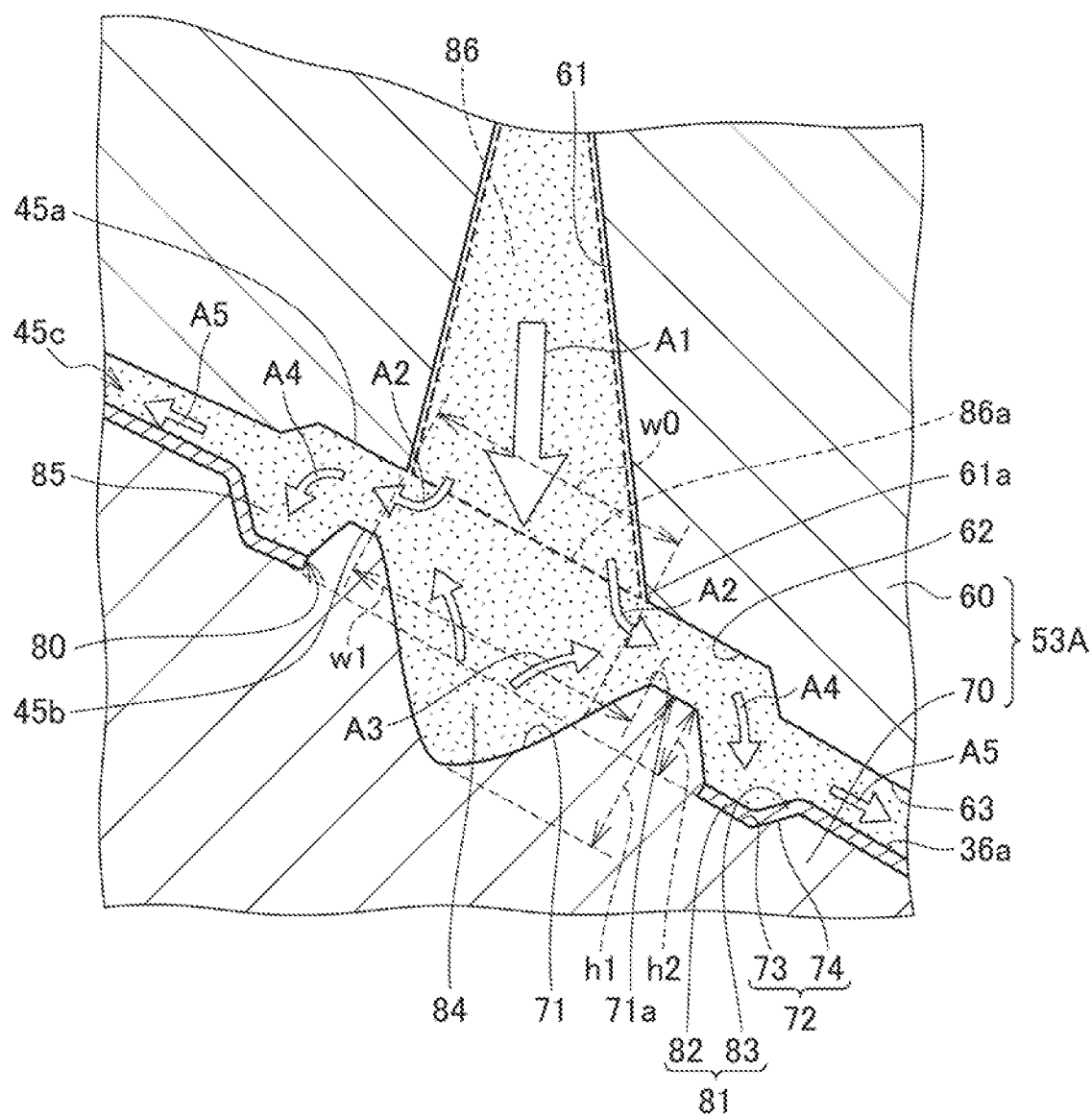
FIG. 5 is a main part explanatory diagram of injection molding for an upper half body of the fuel tank body.

FIG. 5 is a main part explanatory diagram of the injection molding of the upper half body 45.

The upper half body 45 of the fuel tank body 35 is molded using a mold 53A.

The mold 53A includes a cavity mold 60 disposed on the side of an upper surface (outer surface) 45a of the upper half body 45 and a core mold 70 disposed on the side of a lower surface (inner surface) 45b of the upper half body 45. A molding space 45c that is to be filled with a resin to mold the upper half body 45 is formed by a space between the cavity mold 60 and the core mold 70.

In the cavity mold 60, a gate portion (resin pouring gate portion) 61 is formed. An opening portion 61a of the gate portion 61 has a rectangle shape. The opening portion 61a of the gate portion 61 is provided at a position at which the upper surface 45a of the upper half body 45 is molded and is thus a so-called direct gate. A resin is poured from an injection portion 54 (see FIG. 4) of an injection molding machine into the gate portion 61. The molding space 45c of the mold 53A is filled with the resin passing through the opening portion 61a of the gate portion 61. In the molding space 45c, the flowing direction of the resin is further directed to the downstream side as the resin is separated further from the opening portion 61a of the gate portion 61. Note that the term "upstream side" will be used as having a meaning of an upstream side in the resin flowing direction while the term "downstream side" will be used as having a meaning of a downstream side in the resin flowing direction.

A flat plate portion 62 is formed in the periphery of the opening portion 61a of the gate portion 61. A flat plate portion 63 that expands on the side of the core mold 70 to narrow the molding space 45c is formed on the downstream side with respect to the flat plate portion 62.

In the core mold 70, a recessed portion (wall surface) 71 with a conical shape is formed at a position facing the opening portion 61a of the gate portion 61. The recessed portion 71 is recessed in a V shape in a side view. An opening width w1 of an opening portion 71a of the recessed portion 71 is greater than an opening width w0 of the opening portion 61a of the gate portion 61. The resin that has advanced via the opening portion 61a is likely to advance into the recessed portion 71. Note that the opening width w1 of the recessed portion 71 may be substantially the same size as the opening width w0 of the gate portion 61. The resin poured from the gate portion 61 is likely to advance into the recessed portion 71 and remain in the recessed portion 71.

An annular depressed portion (annular depressed groove) 72 is formed on the downstream side of the recessed portion 71. The annular depressed portion 72 is recessed with respect to the mold surface of the core mold 70. The depth h2 of the annular depressed portion 72 is set to be shallower than the depth h1 of the recessed portion 71. The resin is more likely to overflow from the annular depressed portion 72 than from the recessed portion 71 in a case in which the resin flows thereinto. The annular depressed portion 72 is formed to face a boundary position between the flat plate portion 62 and the flat plate portion 63 of the cavity mold 60. The resin is guided by the flat plate portion 62 and the flat plate portion 63 and is thus likely to flow into the annular depressed portion 72. The annular depressed portion 72 includes a bottom portion 73 and an inclined portion 74 that is inclined with respect to the bottom portion 73 and becomes shallower toward the downstream side.

At the time of the injection molding of the upper half body 45, the upper barrier sheet layer 36a is set in the core mold 70.

The upper barrier sheet layer 36a is shaped in advance in accordance with the shape of the lower surface 45b of the upper half body 45. The upper barrier sheet layer 36a has a container shape with a lower surface opened, as illustrated in FIG. 2. The upper barrier sheet layer 36a includes an opening edge portion 36a1 with an opening shape disposed along the upper bonding portion 47, a fuel filler port portion 36a2 with an opening shape formed at the position of the fuel filler port 31, and an opening portion 80 formed in accordance with the position of the gate portion 61. Each of the opening edge portion 36a1 and the fuel filler port portion 36a2 is bent, and the opening edge portion 36a1 and the fuel filler port portion 36a2 are joined within the resin of the upper half body 45 in a buried state.

The opening portion 80 of the upper barrier sheet layer 36a is disposed outside the opening portion 61a in the radial direction so as to surround the opening portion 61a of the gate portion 61 as illustrated in FIG. 5. The upper barrier sheet layer 36a is adapted to easily avoid contact with a high-temperature high-pressure resin immediately after flowing from the gate portion 61 since the opening portion 80 is located outside the opening portion 61a of the gate portion 61.

The opening portion 80 includes a bent-shaped portion 81 with an annular plate shape. The bent-shaped portion 81 is bent so as to move away from a mainstream portion through which the resin flows. The bent-shaped portion 81 is bent such that the bent-shaped portion 81 becomes deeper on the upstream side. The bent-shaped portion 81 is accommodated in the annular depressed portion 72 in the core mold 70. The bent-shaped portion 81 includes an end portion 82 disposed at the bottom portion 73 of the annular depressed portion 72 and an inclined portion 83 disposed at the inclined portion 74 of the annular depressed portion 72.

After the upper barrier sheet layer 36a is set in the core mold 70, the cavity mold 60 and the core mold 70 are closed and fastened. The resin is poured from the gate portion 61 to fill the molding space 45c between the cavity mold 60 and the core mold 70 with the resin.

The resin poured into the gate portion 61 flows along the gate portion 61 as represented by the arrow A1. Since the opening width w1 of the recessed portion 71 is greater than the opening width w0 of the gate portion 61, a most part of the resin flows into the recessed portion 71. Also, the remaining resin flows to the downstream side along with the resin overflowing from the recessed portion 71 as represented by the arrow A2.

The resin flowing into the recessed portion 71 remains in the recessed portion 71 and forms a resin gathering part 84. In the resin gathering part 84, orientations and pressures in the flowing resin are leveled. The resin in the recessed portion 71 is guided by the wall surface of the core mold 70 with a V shape in a side view, for example, flows as represented by the arrow A3, overflows from the recessed portion 71 little by little, and moves to the downstream side.

It is possible to promote rectification in the flowing direction while removing air contained in the resin flowing from the gate portion 61 by the resin gathering part 84 being formed in the recessed portion 71.

On the downstream side of the recessed portion 71, the resin advances into the annular depressed portion 72 as represented by the arrow A4 and also flows along the upper barrier sheet layer 36a as represented by the arrow A5. The upper barrier sheet layer 36a includes the bent-shaped portion 81 disposed at the annular depressed portion 72, and the resin advancing into the annular depressed portion 72 flows so as to press the upper barrier sheet layer 36a against the core mold 70. It is possible to prevent the resin from turning in a direction in which the resin causes the upper barrier sheet layer 36a to peel off and to improve bonding strength between the upper barrier sheet layer 36a and the poured resin.

The resin is likely to advance into the annular depressed portion 72 regardless of a flowing pressure of the resin, and the bent-shaped portion 81 at the annular depressed portion 72 is likely to be reliably pressed even if there is a change in flowing pressure of the resin. It is thus possible to curb influences of the flowing pressure of the resin on the bonding strength of the upper barrier sheet layer 36a and to further improve quality of a resin molded article into which the upper barrier sheet layer 36a is inserted.

The resin gathering part 84 projects into the opening portion 80 of the upper barrier sheet layer 36a, and the resin after the rectification is likely to flow through the bent-shaped portion 81. Since the resin after the rectification flows to the upper barrier sheet layer 36a, it is possible to prevent the bent-shaped portion 81 from peeling off.

When the filling with the resin is completed, then the resin is cooled with the state in which the resin is pressurized maintained. When the resin is cooled and solidified, then the upper half body 45 in accordance with the shape of the molding space 45c is formed.

The upper barrier sheet layer 36a is insert-coupled to the upper half body 45.

A solidified resin gathering part 84 is formed in accordance with the recessed portion 71. The resin gathering part 84 has a thick portion inside the opening portion 80 of the upper barrier sheet layer 36a. The resin gathering part 84 can lead to an increase in the thick portion at the position facing the opening portion 61a of the gate portion 61, and it is possible to reduce influences caused by the thick portion being not covered with the upper barrier sheet layer 36a.

An annular projecting portion 85 is formed in accordance with the annular depressed portion 72. The bent-shaped portion 81 of the opening portion 80 of the upper barrier sheet layer 36a is coupled to the annular projecting portion 85 in an accommodated state.

A resin portion 86 is formed in accordance with the gate portion 61.

The cavity mold 60 and the core mold 70 are opened, the solidified upper half body 45 is extracted, the resin portion 86 solidified at the gate portion 61 is cut, and a cut portion (removed portion) 86a illustrated in FIGS. 1 and 2 is formed in the upper surface 45a of the upper half body 45.

As described above, the upper half body 45 to be welded as illustrated in FIG. 4 is formed.

Figure 6:
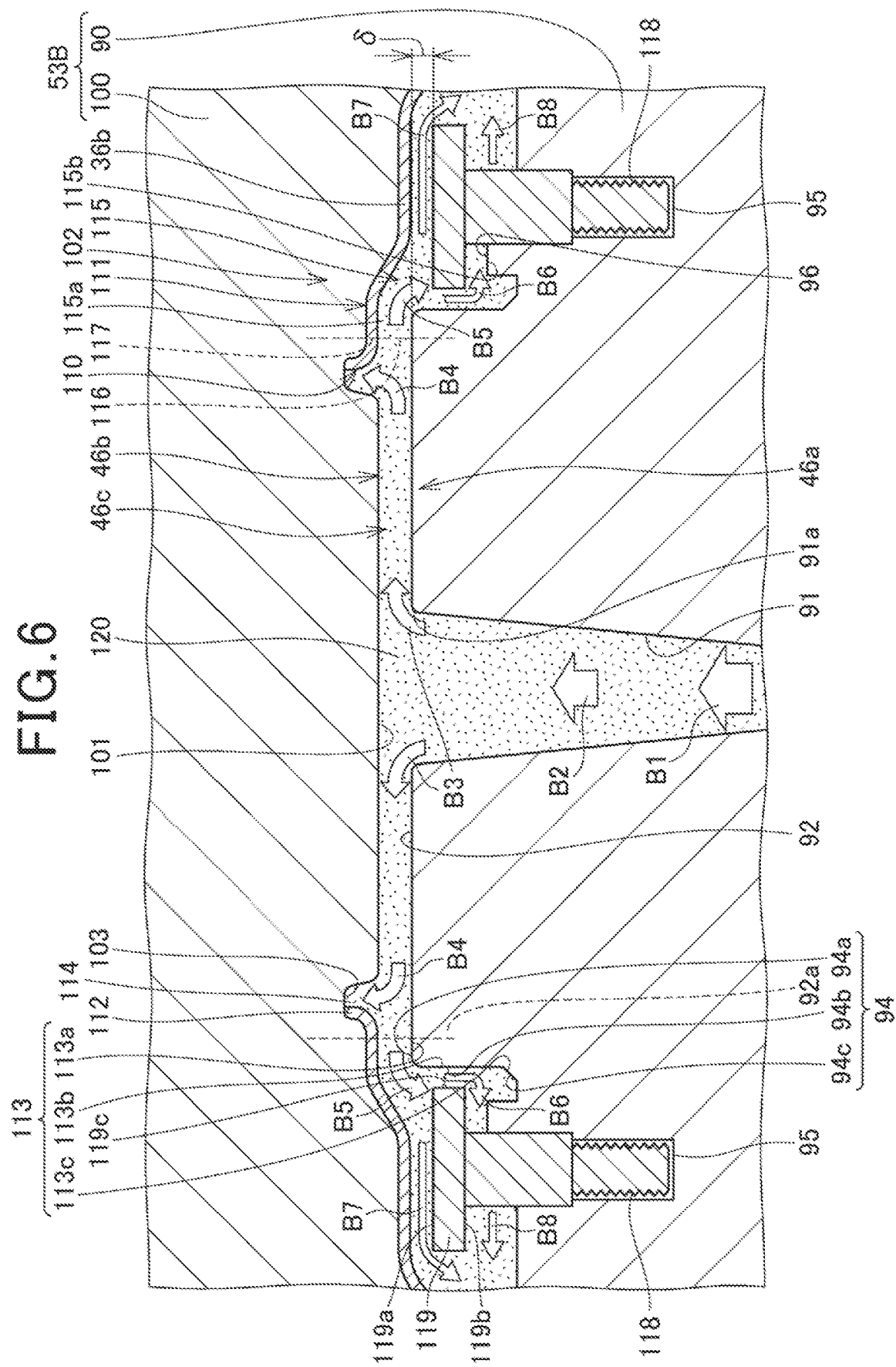
FIG. 6 is a main part explanatory diagram of injection molding for a lower half body of the fuel tank body.

FIG. 6 is a main part explanatory diagram of injection molding of the lower half body 46.

The lower half body 46 of the fuel tank body 35 is molded using a mold 53B.

The mold 53B includes a cavity mold 90 disposed on the side of a lower surface (outer surface) 46a of the lower half body 46 and a core mold 100 disposed on the side of the upper surface (inner surface) 46b of the lower half body 46. A molding space 46c which is filled with the resin to mold the lower half body 46 is formed by a space between the cavity mold 90 and the core mold 100.

A gate portion (resin pouring gate portion) 91 is formed in the cavity mold 90. An opening portion 91a of the gate portion 91 has a circular shape. The gate portion 91 is disposed at a cut portion 120 that is a resin layer to be cut when a pump attachment port 44 (see FIG. 2) is formed. The gate portion 91 is a so-called direct gate. The resin is poured from the injection portion 54 (see FIG. 4) of the injection molding machine into the gate portion 91. The molding space 46c of the mold 53B is filled with the resin passing through the opening portion 91a of the gate portion 91. A part further away from the opening portion 91a of the gate portion 91 corresponds to the downstream side in the molding space 46c.

A planar portion (the mold surface on the upstream side) 92 is formed in the periphery of the opening portion 91a of the gate portion 91. The planar portion 92 is larger than a cut position 92a at which the pump attachment port 44 (see FIG. 2) with an opening shape is formed. A step portion 94 with a step difference with respect to the planar portion 92 is formed on the downstream side with respect to the planar portion 92. The step portion 94 includes a horizontal wall 94a configured of a downstream-side end portion of the planar portion 92, a vertical wall 94b perpendicular to the horizontal wall 94a, and a tapered wall 94c formed at an end portion of the vertical wall 94b on the downstream side. The resin flowing along the planar portion 92 is likely to move along the step portion 94, and a flow of the resin is likely to change.

On the downstream side of the step portion 94, a plurality of holding portions 95 with a depression hole shape are formed. An insert plate 119 including weld bolts 118 is held by the holding portions 95. The insert plate 119 is a member with an annular plate shape, four weld bolts 118 are welded to one surface 119b at equal intervals on the same circumference, and the other surface 119a is formed into a flat surface. The insert plate 119 is disposed in the molding space 46c so as to surround the gate portion 91 by the weld bolts 118 being held by the holding portions 95.

On the upstream side of the holding portions 95, a throttle portion (resistance portion) 96 with such a shape that a mold surface expands on the side of the molding space 46c is provided. The throttle portion 96 serves as a resistance against a flow of the resin and lowers the flow rate of the resin.

The insert plate 119 is disposed with an offset on the side of the cavity mold 90 with respect to the planar portion 92 on the upstream side. The other surface 119a of the insert plate 119 is offset δ in a direction perpendicular to the planar portion 92. The resin flowing along the planar portion 92 is unlikely to be brought into direct contact with a side portion (side surface) 119c of the insert plate 119, and the insert plate 119 is unlikely to receive a pressure from the side.

In the core mold 100, a planar portion 101 is formed at a position facing the opening portion 91a of the gate portion 91. On the downstream side of the planar portion 101, a guide mold surface portion (gradually changing mold surface portion) 102 is formed. The guide mold surface portion 102 has such an inclined shape that the mold surface further expands on the side of the cavity mold 90 toward the downstream side. With the guide mold surface portion 102, the thickness of the resin layer of the lower half body 47 is thicker on the upstream side closer to the gate portion 91 and is thinner on the downstream side further away from the gate portion 91 as illustrated in FIG. 2.

As illustrated in FIG. 6, the guide mold surface portion 102 is formed from a position on the upstream side beyond the step portion 94 and is formed up to a position on the downstream side beyond the insert plate 119.

The resin is guided to the side of the cavity mold 90 by the guide mold surface portion 102. The resin guided to the side of the cavity mold 90 is likely to apply a pressure to the surface 119a of the insert plate 119.

An annular depressed portion (annular depressed groove) 103 is formed at an upstream end of the guide mold surface portion 102. The annular depressed portion 103 is depressed with respect to the mold surface of the core mold 100.

The lower barrier sheet layer 36b is set in the core mold 100 at the time of the injection molding of the lower half body 46.

The lower barrier sheet layer 36b is shaped in advance in accordance with the shape of the upper surface 46b of the lower half body 46. The lower barrier sheet layer 36b has a container shape with an upper surface opened, as illustrated in FIG. 2. The lower barrier sheet layer 36b includes an opening edge portion 36b1 with an opening shape disposed along the lower bonding portion 48 and an opening portion 110 formed in accordance with the position of the gate portion 91. The opening edge portion 36b1 is bent and is coupled to the inside of the resin of the lower half body 46 in a buried state.

The opening portion 110 of the lower barrier sheet layer 36b is disposed outside the opening portion 91a in the radial direction so as to surround the opening portion 91a of the gate portion 91 as illustrated in FIG. 6. The lower barrier sheet layer 36b is likely to avoid contact with a high-temperature high-pressure resin immediately after flowing from the gate portion 91 since the opening portion 110 is located outside the opening portion 91a of the gate portion 91.

The opening portion 110 includes a bent-shaped portion 111 with an annular plate shape. The bent-shaped portion 111 is bent so as to move away from a mainstream portion through which the resin flows. The bent-shaped portion 111 has a bent shape in accordance with the mold surface shape of the guide mold surface portion 102 of the core mold 100. The bent-shaped portion 111 has an inclined shape further expanding on the side of the cavity mold 90 toward the downstream side. An end portion 112 of the bent-shaped portion 111 is bent upward and is accommodated in the annular depressed portion 103 of the core mold 100.

After the lower barrier sheet layer 36b is set in the core mold 100, the cavity mold 90 and the core mold 100 are closed and fastened. The resin is poured from the gate portion 91 to fill the molding space 46c of the cavity mold 90 and the core mold 100 with the resin.

The resin pouring into the gate portion 91 flows along the gate portion 91 as represented by the arrows B1 and B2. The resin flows from the gate portion 91 to the molding space 46c, then changes the orientation of the flow, and flows through the molding space 46c sandwiched between the planar portion 92 of the cavity mold 90 and the planar portion 101 of the core mold 100 as represented by the arrow B3. The high-temperature high-pressure resin immediately after flowing from the gate portion 91 is likely to be rectified when the resin passes through the space sandwiched between the planar portion 92 and the planar portion 101.

On the downstream side of the planar portion 101, the resin advances into the annular depressed portion 103 and flows along the lower barrier sheet layer 36b as represented by the arrow B4. The lower barrier sheet layer 36b includes an end portion 112 of the bent-shaped portion 111 disposed in the annular depressed portion 103, and the resin advancing into the annular depressed portion 103 flows so as to press the lower barrier sheet layer 36b against the core mold 100. It is possible to prevent the resin from turning in a direction in which the resin causes the lower barrier sheet layer 36b to peel off and to improve bonding strength between the lower barrier sheet layer 36b and the poured resin.

Also, since the resin advances into the annular depressed portion 103, the lower barrier sheet layer 36b is likely to be pressed by the resin. Moreover, the bent-shaped portion 111 disposed at the guide mold surface portion 102 receives a force pressed to the side of the core mold 100 from the resin, as a reaction of guiding the resin to the side of the insert plate 119. Thus, the lower barrier sheet layer 36b is likely to be reliably pressed even if there is a change in flowing pressure of the resin, and it is possible to curb influences of the flowing pressure of the resin on the bonding strength of the lower barrier sheet layer 36b and to further improve quality of the resin molded article into which the lower barrier sheet layer 36b is inserted.

The guide mold surface portion 102 and the bent-shaped portion 111 have a shape of gradually expanding on the side of the cavity mold 90 from the upstream side (one side) to the downstream side (the other side) at a position facing the surface 119a of the insert plate 119 such that the thickness of the resin layer is gradually changed. The resin is guided to the side of the cavity mold 90 and is likely to flow toward the surface 119a of the insert plate 119 as represented by the arrow B5. Since the orientation of the flowing resin can be deflected toward the surface 119a of the insert plate 119, the insert plate 119 is likely to receive a pressure from the resin at the surface 119a. Since the insert plate 119 is pressed to the side of the cavity mold 90, the insert plate 119 is unlikely to float or be twisted due to the flow of the resin, and it is thus possible to prevent positional deviation and deformation of the insert plate 119.

In particular, the insert plate 119 is disposed on the downstream side of the step portion 94 of the cavity mold 90, and the surface 119a of the insert plate 119 is offset 6 on the side of the cavity mold 90 with respect to the planar portion 92 positioned on the upstream side. The resin flowing toward the insert plate 119 as represented by the arrow B5 either flows along the surface 119a of the insert plate 119 as represented by the arrow B7, or flows between the step portion 94 and the side portion 119c of the insert plate 119 as represented by the arrow B6 and then flows along the surface 119b of the insert plate 119 as represented by the arrow B8. Since it is possible to generate a pressure difference due to a difference in flow rate between the surfaces 119a and 119b on both sides of the insert plate 119 by the amount of the offset 6, the insert plate 119 is likely to be pressed on the side of the cavity mold 90, and it is possible to further prevent positional deviation and deformation of the insert plate 119.

The annular depressed portion 103 that accommodates the end portion 112 of the lower barrier sheet layer 36b is formed on the upstream side with respect to the position at which the insert plate 119 is disposed. Thus, it is possible to prevent burr of the lower barrier sheet layer 36b with the annular depressed portion 103 and to stably guide the resin to the side of the insert plate 119 with the guide mold surface portion 102, and the flow of the resin to the insert plate 119 is not inhibited. It is thus possible to further improve quality in regard to insert-coupling of the lower barrier sheet layer 36*b* and the insert plate 119.

When the filling with the resin is completed, the resin is cooled with the state in which the resin is pressurized maintained. When the resin is cooled and solidified, then the lower half body 46 in accordance with the shape of the molding space 46*c* is formed.

The lower barrier sheet layer 36*b* is insert-coupled to the lower half body 46.

The insert plate 119 and the weld bolts 118 are insert-coupled to the lower half body 46.

An annular projecting portion 114 is formed in accordance with the annular depressed portion 103. The end portion 112 of the opening portion 110 of the lower barrier sheet layer 36*b* is coupled to the annular projecting portion 114 in an accommodated state.

A step portion 113 is formed in accordance with the step portion 94, and a horizontal wall 113*a*, a vertical wall (wall surface) 113*b*, and a tapered wall 113*c* are formed in accordance with the horizontal wall 94*a*, the vertical wall 94*b*, and the tapered wall 94*c*.

A gradually changing thickness portion (resin layer) 115 is formed in accordance with the guide mold surface portion 102. The gradually changing thickness portion 115 includes an upstream-side flowing-in portion 115*a* formed at a position between the guide mold surface portion 102 of the core mold 100 and the planar portion 92 of the cavity mold 90. Also, a depression 115*b* is formed in the gradually changing thickness portion 115 in accordance with the throttle portion 96.

The cut portion 120 is formed in accordance with the gate portion 91 and a space between the planar portions 92 and 101.

Figure 7:
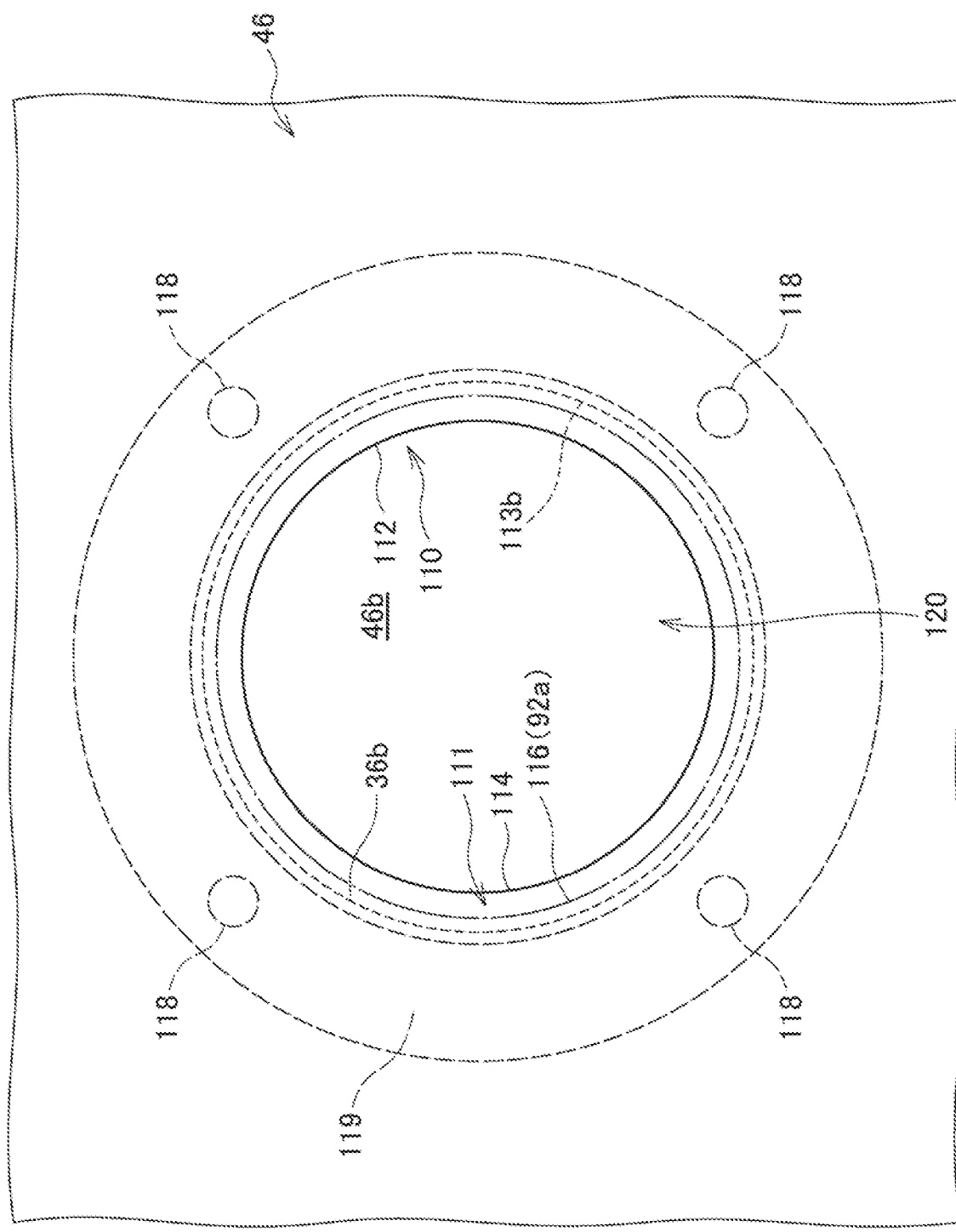
FIG. 7 is an explanatory diagram of the lower half body of the fuel tank body seen from an inner surface side.

FIG. 7 is an explanatory diagram of the lower half body 46 seen from the side of the upper surface (inner surface) 46*b*.

Referring to FIGS. 6 and 7, the lower half body 46 is cut into a circular shape at a cut position 92*a* set between the annular projecting portion 114 and the step portion 113. In this manner, the cut portion 120 with the resin at the gate portion 91 is removed.

A cut portion (removed portion) 116 with a surface shape cut into an opening shape is formed in the lower half body 46.

A portion of the bent-shaped portion 111 on the side of the end portion 112 is cut, and a cut portion (opening portion) 117 with a surface shape cut into a larger opening shape than the opening portion 110 is thus formed in the lower barrier sheet layer 36*b*. The cut portion 116 and the cut portion 117 are formed in the same plane and configure the pump attachment port (an opening for attachment of an auxiliary component attachment, an opening for attachment of a related part) 44.

In the embodiment, the opening portion 110 of the lower barrier sheet layer 36*b* is molded while being disposed in the cut portion 120 to be cut. In addition, since the cutting is performed at the cut position 92*a*, which is separated from the end portion 112 of the opening portion 110 of the lower barrier sheet layer 36*b* to the downstream side, in which no burr has occurred, coupling quality of the lower barrier sheet layer 36*b* is improved. Also, since the resin at the gate portion 91 is also removed at the same time with the cutting working for forming the pump attachment port 44, this enables working to be simplified.

As described above, the lower half body 46 to be welded as illustrated in FIG. 4 is formed.

Figure 8:
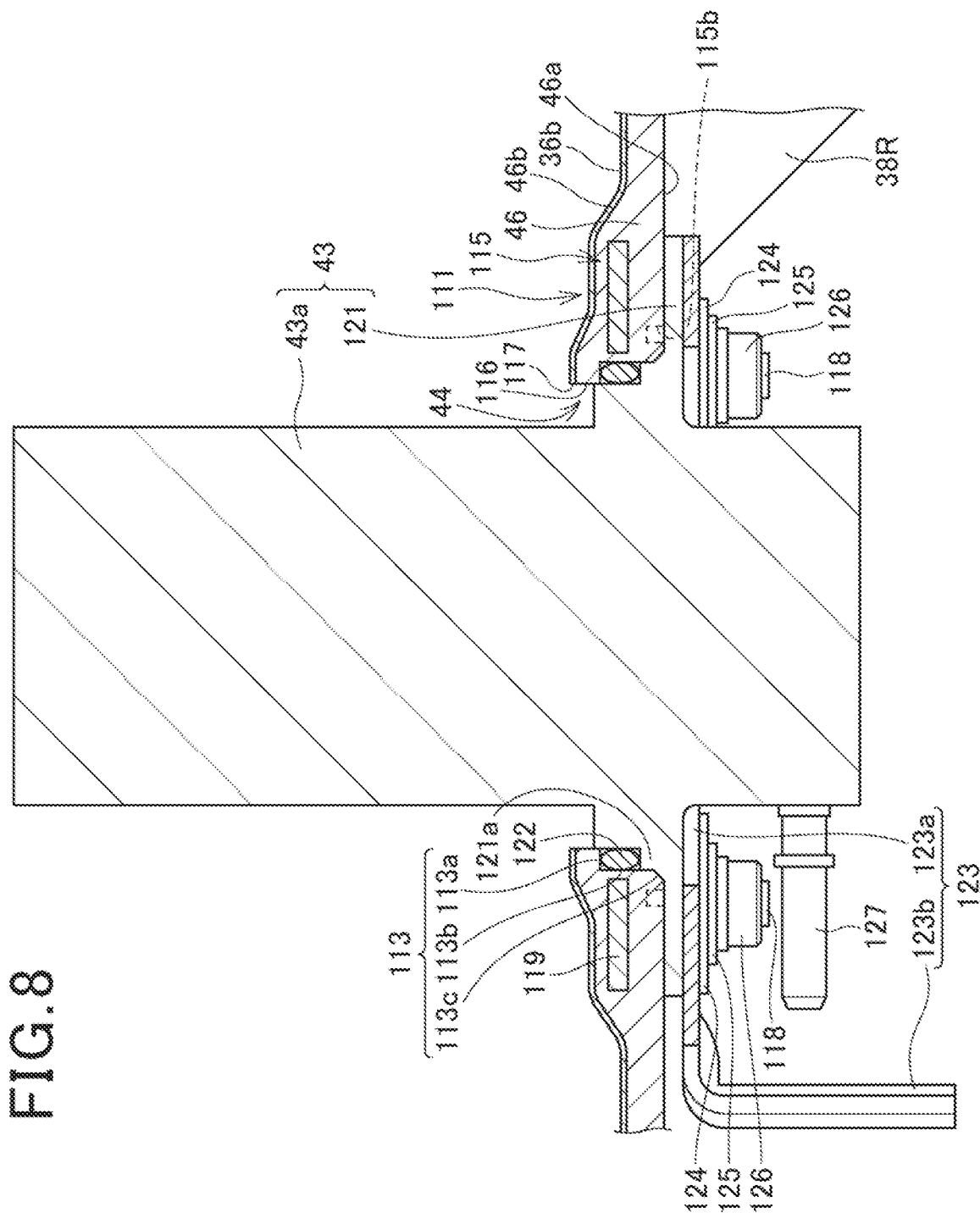
FIG. 8 is an explanatory diagram of an attachment structure of the fuel pump 43.

FIG. 8 is an explanatory diagram of an attachment structure of the fuel pump 43.

The fuel pump 43 is attached to the lower half body 46 of the fuel tank 30 after welding.

The fuel pump 43 includes a pump body portion 43*a* with a cylindrical shape and a flange portion 121 provided at a lower portion of the pump body portion 43*a*. Four securing holes (not illustrated) are formed in the flange portion 121, and the weld bolts 118 are inserted into the securing holes (not illustrated).

The pump body portion 43*a* is inserted into the pump attachment port 44, and the flange portion 121 is caused to abut on the lower surface 46*a* of the lower half body 46.

An 0 ring (sealing member) 122 is disposed between the pump body portion 43*a* and the step portion (sealing member bonding portion) 113 of the lower half body 46. The 0 ring 122 tightly closes a gap between the lower half body 46 and the pump body portion 43*a*. The 0 ring 122 can easily be positioned by placing it in an abutting manner against the horizontal wall 113*a* of the step portion 113 and the vertical wall 113*b*. The 0 ring 122 also improves positioning precision with respect to the insert plate 119. The 0 ring 122 causes less positional deviation with respect to the fuel pump 43 secured to the insert plate 119 and reliably facilitates tight closing of the gap.

An abutting portion 121*a* that abuts on the 0 ring 122 from the lower side is formed in the flange portion 121 of the fuel pump 43. Since the horizontal wall 113*a*, the vertical wall 113*b*, and the abutting portion 121*a* abuts on the 0 ring 122 from three sides, deformation control of the 0 ring 122 is easily performed, and tight closing is further facilitated. The inclination of the tapered wall 113*c* makes it easy to insert the pump body portion 43*a* into the pump attachment port 44.

A flange pressing ring plate 123 is disposed below the flange portion 121. The flange pressing ring plate 123 includes a plate portion 123*a* with an annular plate shape. Securing holes, which are not illustrated, are formed in the plate portion 123*a*, and the weld bolts 118 are inserted into the securing holes (not illustrated). A guard portion 123*b* with a curbed piece shape is formed integrally with the plate portion 123*a*. The plate portion 123*a* presses the flange portion 121 of the fuel pump 43 from the lower side, and the guard portion 123*b* protects a fuel pump outlet 127 from the outside. A fuel hose (not illustrated) is connected to the fuel pump outlet 127.

The flange portion 121 of the fuel pump 43, the plate portion 123*a* of the flange pressing ring plate 123, a flat washer 124, and a loosening stopper washer 125 are attached in this order to each of the weld bolts 118, and a nut 126 is fastened at last. In this manner, the fuel pump 43 is attached to the fuel tank 30.

In the embodiment, the fuel tank 30 made of a resin in which deformation and burr of the barrier sheet layer 36 are curbed and positional deviation and the like of the insert plate 119 are also curbed is formed.

As described above, according to the embodiment to which the present invention is applied, the gradually changing thickness portion 115 in which the thickness of the resin layer gradually changes from one side to the other side with respect to the surface 119*a* of the insert plate 119 is formed at a region of the resin layer to which the insert plate 119 is inserted, in the resin tank formed through resin injection molding. Thus, it is possible to deflect an orientation of a flow of the resin applied to the insert plate 119 to a flow in the direction of the surface of the insert plate 119 with respect to the flowing of the resin from the gate portion 61 for the injection molding using the gradually changing thickness portion 115 and thereby to prevent positional deviation and deformation of the insert plate 119.

In the embodiment, the gradually changing thickness portion 115 is provided such that with respect to the surface 119a of the insert plate 119, the thickness is thick on the upstream side in the resin flowing direction and the thickness is thin on the downstream side in the resin flowing direction, and the surface 119a of the insert plate 119 is offset 6 in the direction away from the upstream-side flowing-in portion 115a, of the gradually changing thickness portion 115, positioned on the upstream side in the direction perpendicular to the surface 119a. Thus, it is possible to generate a pressure difference due to a difference in flow rate between the surfaces 119a and 119b on both sides of the insert plate 119 by the amount of the offset 6 and thereby to further prevent deviation and deformation of the insert plate 119.

Also, in the embodiment, the fuel tank 30 is adapted such that the gate portion 91 is provided at the region surrounded by the insert plate 119, the step portion 113 with the offset 6 with respect to the upstream-side flowing-in portion 115a is formed, the step portion 113 is caused to serve as the sealing member bonding portion 113 having the horizontal wall 113a and the vertical wall 113b extending in the direction perpendicular to the horizontal wall 113a, and the opening shape is cut with the sealing member bonding portion 113 left to form the pump attachment port 44. Thus, since the 0 ring 122 is bonded to the sealing member bonding portion 113 with the step difference shape, positioning precision with respect to the insert plate 119 is also improved. Also, since the cut portion 120 having the gate portion 91 is also removed at the same time with the cutting of the pump attachment port 44, this enables the working to be simplified.

Also, in the embodiment, the fuel tank 30 is further formed in which the lower barrier sheet layer 36b is inserted and injected and the fuel tank 30 has the annular projecting portion 114 which accommodates the end portion 112 of the opening portion 110 of the lower barrier sheet layer 36b in a bent state, on the upstream side of the gradually changing thickness portion 115 in the resin flowing direction. Thus, burr of the lower barrier sheet layer 36b is prevented, the flow of the resin to the insert plate 119 is not inhibited, and it is thus possible to further improve quality.

Also, in the embodiment, the cut portion (removed portion) 116 from which the resin of the gate portion 91 has been removed may be included, the gradually changing thickness portion 115 may be provided such that the thickness is thick on the side close to the cut portion 116 and the thickness is thin on the side away from the cut portion 116 along the flat surface 119a of the insert plate 119, and the side portion 119c of the insert plate 119 may be disposed along the vertical wall 113b provided along the direction perpendicular to the flat surface 119a of the insert plate 119. With this configuration, a pressure difference due to a difference in flowing amounts of the surfaces 119a and 119b on both sides of the insert plate 119 is generated, and it is possible to further prevent positional deviation and deformation of the insert plate 119.

Also, in the embodiment, the cut portion 116 may be formed into an opening shape, the insert plate 119 may be disposed in the periphery of the cut portion 116, the horizontal wall 113a extending in the direction perpendicular to the vertical wall (wall surface) 113b may be formed, and the cut portion 116 may be disposed in the horizontal wall 113a. With this configuration, it is possible to dispose the cut portion 116 in the horizontal wall 113a, to remove the gate portion 91 as well at the same time with the cutting of the opening, and thereby to simplify the working.

As described above, according to the embodiment to which the present invention is applied, positioning and holding the insert plate 119 for attachment of an auxiliary component in the cavity mold 90, and disposing, in the core mold 100, the guide mold surface portion 102 for molding the gradually changing thickness portion 115 that is a resin layer such that the thickness of the resin layer gradually changes from one side to the other side with respect to the surface 119a of the insert plate 119, in the method for manufacturing a resin tank through resin injection molding. Thus, it is possible to deflect an orientation of the flow of the resin from the gate portion 61 to the flow in the direction of the surface 119a of the insert plate 119 with the guide mold surface portion 102 and thereby to manufacture the fuel tank 30 in which positional deviation and deformation of the insert plate 119 are prevented.

In the embodiment, the guide mold surface portion 102 of the core mold 100 is provided such that with respect to the surface 119a of the insert plate 119, the thickness of the resin layer is thick on the upstream side in the resin flowing direction and the thickness of the resin layer is thin on the downstream side in the resin flowing direction, and the cavity mold 90 is caused to hold the insert plate 119 with an offset in the direction away from the planar portion 92 that is the mold surface on the upstream side of the insert plate 119 in the direction perpendicular to the surface 119a of the insert plate 119. Thus, since the surface 119a of the insert plate 119 is offset (separated) 6 in the direction away from the planar portion 92 on the upstream side in the perpendicularly intersecting direction, it is possible to generate a pressure difference due to a difference in flow rate between the surfaces 119a and 119b on both sides of the insert plate 119 by the amount of the offset 6 and thereby to further prevent positional deviation and deformation of the insert plate 119.

Also, in the embodiment, the gate portion 91 is provided at the region surrounded by the insert plate 119, the resin from the gate portion 91 is caused to flow with the offset 6 with respect to the planar portion 92 to mold the sealing member bonding portion 113 with a step difference shape having the horizontal wall 113a and the vertical wall 113b extending in the direction perpendicular to the horizontal wall 113a, and the resin layer in the periphery of the gate portion 91 is cut with the sealing member bonding portion 113 left to form the pump attachment port 44. Thus, since the 0 ring 122 is bonded to the sealing member bonding portion 113 with the step difference shape, positioning precision with respect to the insert plate 119 is also improved. Also, since the cut portion 120 having the gate portion 91 is also removed at the same time with the cutting of the pump attachment port 44, this enables the working to be simplified.

Also, in the embodiment, the lower barrier sheet layer 36b including the opening portion 110 is disposed in the core mold 100 including the annular depressed portion 103 on the upstream side of the guide mold surface portion 102 in the resin flowing direction with the end portion 112 of the opening portion 110 accommodated in the annular depressed portion 103 in a bent state, and the resin is caused to flow from upstream beyond the annular depressed portion 103. Thus, since the end portion 112 of the opening portion 110 of the lower barrier sheet layer 36b is accommodated in a bent state in the annular depressed portion 103 provided on the upstream side of the guide mold surface portion 102 for molding the gradually changing thickness portion 115 in the resin flowing direction, burr of the lower barrier sheet layer 36b is prevented, and the flow of the resin to the insert plate 119 is not inhibited. It is thus possible to further improve quality.

The aforementioned embodiment is intended to illustrate only aspects of the present invention, and modifications and applications can arbitrarily be made without departing from the gist of the present invention.

A resin gathering part projecting into the opening portion 110 may be formed when the lower half body 46 is formed, and cutting may be performed along with the resin gathering part.

The configuration in which the step portion 113 at the portion at which the insert plate 119 is disposed includes the horizontal wall 113a, the vertical wall 113b perpendicular to the horizontal wall 113a, and the tapered wall 113c has been described. However, a configuration in which the vertical wall 113b is omitted and the insert plate 119 is disposed with an offset with respect to the step portion 113 including the horizontal wall 13a and the tapered wall 113c inclined with respect to the horizontal wall 113a may be employed.

The horizontal wall 113a may be inclined with respect to the horizontal direction while the vertical wall 113b may be inclined with respect to the vertical direction.

REFERENCE SIGNS LIST

36b Barrier sheet
43 Auxiliary component
44 Auxiliary component insertion opening
90 Cavity mold
91 Resin pouring gate portion
92 Planar portion (mold surface on upstream side)
100 Core mold
102 Guide mold surface portion (gradually changing mold surface portion)
103 Annular depressed portion
112 End portion
110 Opening portion
113 Step portion (sealing member bonding portion)
113a Horizontal wall
113b Vertical wall (wall surface)
114 Annular projecting portion
115 Gradually changing thickness portion (resin layer)
115a Upstream-side flowing-in portion
116 Removed portion
119 Insert plate
119a Surface
119c Side surface
122 Sealing member

The invention claimed is:

1. A resin tank formed through resin injection molding, comprising:
a gradually changing thickness portion formed in a resin layer at a region into which an insert plate for attachment of an auxiliary component is inserted, a thickness of the resin layer gradually changing from one side to the other side with respect to a surface of the insert plate,
wherein an auxiliary component insertion opening formed into an opening shape is provided at an upstream-side flowing in portion, of the gradually changing thickness portion, located on an upstream side in a resin flowing direction, and
the gradually changing thickness portion is provided such that with respect to the surface of the insert plate, a thickness is thick on a side close to the auxiliary component insertion opening on the upstream side in the resin flowing direction and the thickness is thin on a side away from the auxiliary component insertion opening on a downstream side in the resin flowing direction, and the surface of the insert plate is offset in a direction away from the upstream-side flowing-in portion in a direction perpendicular to the surface of the insert plate.

2. A resin tank formed through resin injection molding, comprising: a gradually changing thickness portion formed in a resin layer at a region into which an insert plate for attachment of an auxiliary component is inserted, a thickness of the resin layer gradually changing from one side to the other side with respect to a surface of the insert plate, wherein
the gradually changing thickness portion is provided such that with respect to the surface of the insert plate, a thickness is thick on an upstream side in a resin flowing direction and the thickness is thin on a downstream side in the resin flowing direction, and the surface of the insert plate is offset in a direction away from an upstream-side flowing-in portion, of the gradually changing thickness portion, located on the upstream side in a direction perpendicular to the surface of the insert plate, and
the resin tank is adapted such that a resin pouring gate portion is provided at a region surrounded by the insert plate, a step portion with the offset with respect to the upstream-side flowing-in portion is formed, the step portion is caused to serve as a sealing member bonding portion having a horizontal wall and a vertical wall extending in a direction perpendicular to the horizontal wall, and n opening shape is formed as an auxiliary component insertion opening with the sealing member bonding portion left.

3. The resin tank according to claim 2, wherein
the resin tank is further formed in which a barrier sheet is inserted and injected and the resin tank has an annular projecting portion which accommodates an end portion of an opening portion of the barrier sheet in a bent state, on the upstream side of the gradually changing thickness portion in the resin flowing direction.

4. The resin tank according to claim 1, further comprising:
a removed portion from which a resin of a resin pouring gate portion has been removed,
wherein the gradually changing thickness portion is provided such that a thickness is thick on a side close to the removed portion and the thickness is thin on a side, away from the removed portion along the flat surface of the insert plate, and
a side surface of the insert plate is disposed along a wall surface provided along a direction perpendicular to the flat surface of the insert plate.

5. The resin tank according to claim 4,
wherein the removed portion is formed into an opening shape,
the insert plate is disposed in a periphery of the removed portion,
a horizontal wall extending in a direction perpendicular to the wall surface is formed, and
the removed portion is disposed in the horizontal wall.

6. A method for manufacturing a resin tank formed through resin injection molding, comprising: positioning and holding an insert plate for attachment of an auxiliary component in a cavity mold, and disposing, in a core mold, a gradually changing mold surface portion for molding a resin layer such that a thickness of the resin layer gradually changes from one side to the other side with respect to a surface of the insert plate, wherein the gradually changing mold surface portion in the core mold is provided such that with respect to the surface of the insert plate, the thickness of the resin layer is thick on an upstream side in a resin flowing direction and the thickness of the resin layer is thin on a downstream side in the resin flowing direction.

7. The method for manufacturing a resin tank according to claim 6, wherein the insert plate is held in the cavity mold with an offset in a direction away from a mold surface on the upstream side of the insert plate in a direction perpendicular to the surface of the insert plate.

8. The method form manufacturing a resin tank according to claim 7, wherein a resin pouring gate portion is provided at a region surrounded by the insert plate, a resin from the resin pouring gate portion is caused to flow with the offset with respect to the mold surface on the upstream side to mold a sealing member bonding portion with a step difference shape having a horizontal wall and a vertical wall extending in a direction perpendicular to the horizontal wall, and the resin layer in a periphery of the resin pouring gate portion is cut with the sealing member bonding portion left to form an auxiliary component insertion opening.

9. The method for manufacturing a resin tank according to claim 6, wherein a barrier sheet including an opening portion is disposed in the core mold including an annular depressed portion on an upstream side of the gradually changing mold surface portion in a resin flowing direction, with an end portion of the opening portion being accommodated in a bent state in the annular depressed portion, and a resin is caused to flow from upstream beyond the annular depressed portion.

10. The method for manufacturing a resin tank according to claim 7, wherein a barrier sheet including an opening portion is disposed in the core mold including an annular depressed portion on an upstream side of the gradually changing mold surface portion in a resin flowing direction, with an end portion of the opening portion being accommodated in, a bent state in the annular depressed portion, and a resin is caused to flow from upstream beyond the annular depressed portion.

11. The method for manufacturing a resin tank according to claim 8, wherein a barrier sheet including an opening portion is disposed in the core mold including an annular depressed portion on an upstream side of the gradually changing mold surface portion in a resin flowing direction, with an end portion of the opening portion being accomodated in a bent state in the annular depressed portion, and a resin is caused tow from upstream beyond the annular depressed portion.

* * * * *